(12) United States Patent
Balensiefer

(10) Patent No.: US 6,543,847 B2
(45) Date of Patent: Apr. 8, 2003

(54) JUVENILE SEAT ASSEMBLY HAVING HARNESS STRAP RETAINER APPARATUS

(75) Inventor: Eugene Balensiefer, Seymour, IN (US)

(73) Assignee: Cosco Management, Inc., Wilmington, DE (US)

( * ) Notice: Subject to any disclaimer, the term of this patent is extended or adjusted under 35 U.S.C. 154(b) by 0 days.

(21) Appl. No.: 09/901,294

(22) Filed: Jul. 9, 2001

(65) Prior Publication Data

US 2002/0036419 A1 Mar. 28, 2002

Related U.S. Application Data

(60) Provisional application No. 60/234,665, filed on Sep. 22, 2000.

(51) Int. Cl.[7] ................................................ A47C 1/08
(52) U.S. Cl. ..................................... 297/250.1; 297/467
(58) Field of Search ................................. 297/464, 467, 297/250.1

(56) References Cited

U.S. PATENT DOCUMENTS

| | | |
|---|---|---|
| 3,709,558 A | 1/1973 | Jakob |
| 3,791,694 A | 2/1974 | Roberts et al. |
| 3,910,634 A | 10/1975 | Morris |
| 3,938,859 A | 2/1976 | Henderson et al. |
| 3,954,280 A | 5/1976 | Roberts et al. |
| 3,992,056 A | 11/1976 | Koziatek et al. |
| 4,033,622 A | 7/1977 | Boudreau |
| 4,040,664 A | 8/1977 | Tanaka et al. |
| 4,186,961 A | 2/1980 | Farrell, Jr. et al. |
| 4,343,510 A | 8/1982 | Cone |
| 4,376,551 A | 3/1983 | Cone |
| 4,402,548 A | 9/1983 | Mason |
| 4,411,473 A | 10/1983 | Ettridge |
| 4,424,760 A | 1/1984 | Grufman |
| 4,429,916 A | 2/1984 | Hyde et al. |

(List continued on next page.)

Primary Examiner—Milton Nelson, Jr.
(74) Attorney, Agent, or Firm—Barnes & Thornburg

(57) ABSTRACT

A juvenile seat assembly includes a seat panel formed to include an opening, a harness including a strap and a mount coupled to the strap, and a retainer coupled to the seat panel. The mount is inserted through the opening and is held in place relative to the seat panel by the retainer.

32 Claims, 7 Drawing Sheets

U.S. PATENT DOCUMENTS

| | | |
|---|---|---|
| 4,436,341 A | 3/1984 | Converse |
| 4,456,302 A | 6/1984 | Knoedler et al. |
| 4,545,613 A | 10/1985 | Martel et al. |
| 4,580,842 A | 4/1986 | Segal |
| 4,632,460 A | 12/1986 | Meeker et al. |
| 4,655,506 A | 4/1987 | Wise et al. |
| 4,662,683 A | 5/1987 | Knoedler et al. |
| 4,690,455 A | 9/1987 | Bailey et al. |
| 4,725,253 A | 2/1988 | Politte |
| 4,738,489 A | 4/1988 | Wise et al. |
| 4,754,999 A | 7/1988 | Kain |
| 4,871,210 A | 10/1989 | Alexander et al. |
| D305,583 S | 1/1990 | Turner et al. |
| 4,912,818 A | 4/1990 | Meeker |
| 4,943,112 A | 7/1990 | Law |
| 4,962,965 A | 10/1990 | Glover |
| 4,998,307 A | 3/1991 | Cone |
| 5,061,012 A | 10/1991 | Parker et al. |
| 5,063,879 A | 11/1991 | Vorbau |
| 5,074,588 A | 12/1991 | Huspen |
| 5,092,004 A | 3/1992 | Cone et al. |
| D325,132 S | 4/1992 | Cone |
| 5,115,523 A | 5/1992 | Cone |
| 5,161,855 A | 11/1992 | Harmon |
| 5,222,641 A | 6/1993 | Medeiros, Jr. |
| 5,224,756 A | 7/1993 | Dukatz et al. |
| 5,299,855 A | 4/1994 | Zubeck |
| 5,310,242 A | 5/1994 | Golder |
| D353,493 S | 12/1994 | Schwartzkopf et al. |
| 5,451,093 A | 9/1995 | Petrie et al. |
| 5,472,260 A * | 12/1995 | Czapski et al. |
| 5,496,092 A | 3/1996 | Williams et al. |
| D369,911 S | 5/1996 | Turner |
| 5,533,786 A | 7/1996 | Cone, II |
| 5,538,322 A | 7/1996 | Cone et al. |
| 5,567,008 A | 10/1996 | Cone, II |
| 5,593,207 A | 1/1997 | Turner |
| 5,599,063 A | 2/1997 | Lister et al. |
| 5,625,956 A | 5/1997 | Cone, II et al. |
| 5,690,382 A | 11/1997 | Cone |
| 5,713,630 A | 2/1998 | Kvalvik |
| 5,779,319 A | 7/1998 | Merrick |
| 5,816,652 A | 10/1998 | Cone et al. |
| D402,477 S | 12/1998 | Cone, II |
| 5,868,465 A | 2/1999 | Kvalvik |
| 5,890,769 A | 4/1999 | Fairbanks |
| 5,964,502 A | 10/1999 | Stephens |
| 5,971,492 A | 10/1999 | Pitman |
| 6,000,753 A | 12/1999 | Cone, II |
| 6,068,335 A | 5/2000 | Glover |
| 6,089,662 A | 7/2000 | Lambert et al. |
| D429,075 S | 8/2000 | Cone, II |
| 6,179,329 B1 | 1/2001 | Bradley |
| 6,186,521 B1 | 2/2001 | Divoky et al. |
| 6,205,600 B1 | 3/2001 | Sedlack |

\* cited by examiner

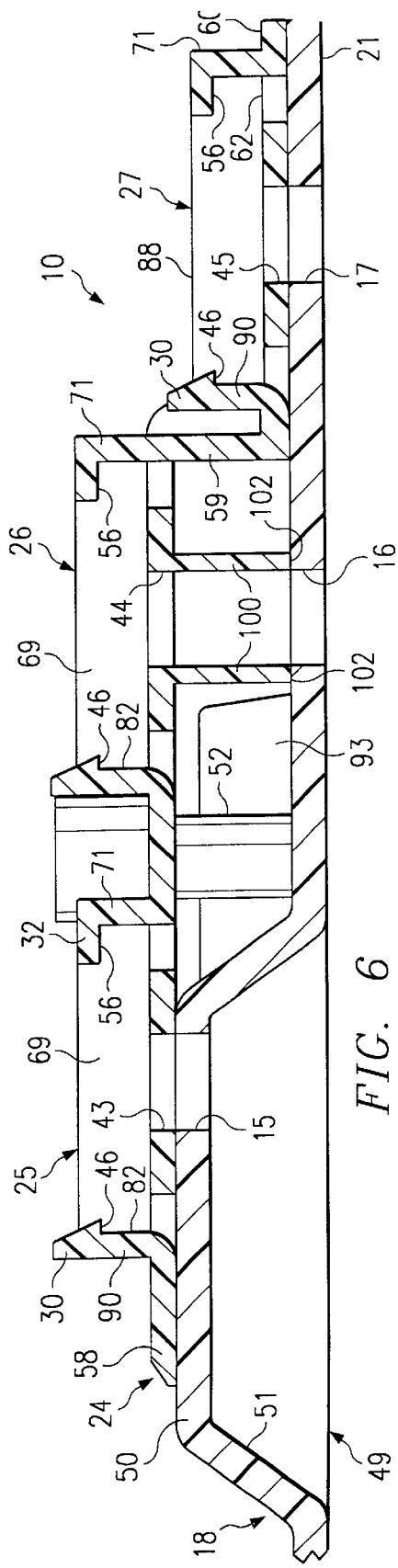
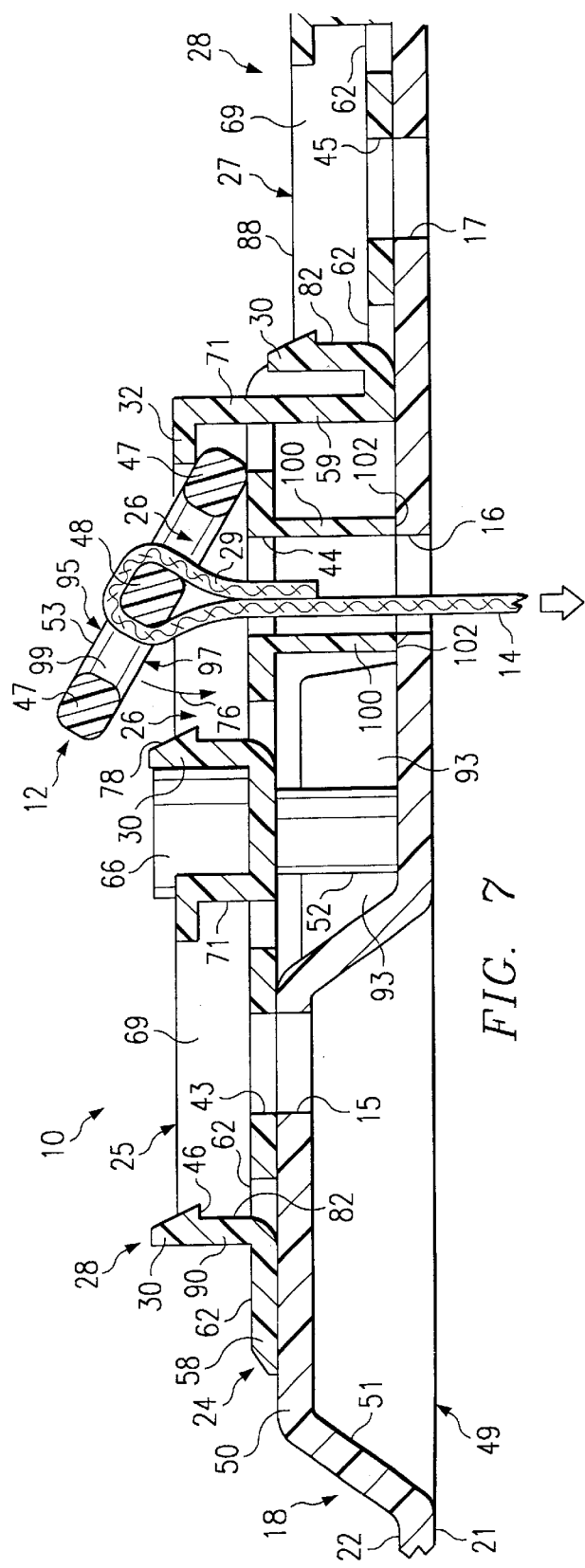
FIG. 6
FIG. 7

US 6,543,847 B2

JUVENILE SEAT ASSEMBLY HAVING HARNESS STRAP RETAINER APPARATUS

This application claims priority under 35 U.S.C. 119(e) to U.S. Provisional Application Ser. No. 60/234,665, filed Sep. 22, 2000, which is expressly incorporated by reference herein.

BACKGROUND AND SUMMARY OF THE INVENTION

The present invention relates to a juvenile seat assembly, and particularly, to a juvenile seat assembly having a safety harness that restrains a child in a seat of the juvenile seat assembly. More particularly, the present invention relates to ajuvenile seat assembly having a harness strap retainer apparatus.

Juvenile seat assemblies having safety harnesses to restrain children in seats of juvenile seat assemblies are well known. Such juvenile seat assemblies often are included in car seats, strollers, and child swings. The harnesses used in juvenile seat assemblies usually include a number of straps. The length of the straps and the connection points between one or more of the straps and the seats of juvenile seat assemblies are usually adjustable so that the juvenile seat assemblies are able to accommodate children of different sizes. Adjusting the connection points between straps and seats of some conventional juvenile seat assemblies can be a cumbersome, time consuming process. Thus, caregivers of children would appreciate ajuvenile seat assembly having a simple, easy-to-use harness strap retainer apparatus for adjusting the connection point of the harness to the seat.

According to the present disclosure, a juvenile seat assembly includes a seat having a seat panel formed to include an opening. The juvenile seat assembly also includes a harness having a strap and a mount coupled to the strap. The mount is movable relative to the seat between a first orientation in which the mount is able to pass through the opening and a second orientation in which the mount is unable to pass through the opening. The juvenile seat assembly further includes a retainer coupled to the seat panel. The mount is couplable to the retainer to be held in the second orientation by the retainer. The strap extends from the mount through the opening when the mount is coupled to the retainer.

In an illustrative embodiment, the retainer is formed to include a pocket. The mount is sized to fit into the pocket so that the mount is unable to move front-to-back and side-to-side relative to the seat panel when the mount is coupled to the retainer. The illustrative retainer also includes a pair of locking elements that engage the mount to prevent the mount from falling downwardly out of the pocket. The pair of illustrative locking elements includes two retaining tabs, one of which is coupled to a flexible finger. A user flexes the flexible finger to move the associated retaining tab out of engagement with the mount. The user is then able to remove the mount from the pocket thereby detaching the mount from the retainer.

According to the illustrative embodiment, the seat assembly includes a seat panel having three openings formed therein and a retainer having three pockets along with three pairs of locking elements. Each of the three pockets is associated with a respective one of the three openings in the seat panel and the strap extends from the mount through whichever of the openings is associated with the pocket occupied by the mount. Thus, the mount and strap are selectively attachable to the seat panel at three different positions. A user will select one of the three positions based upon the size of the child to be seated in the juvenile seat assembly. In alternative embodiments, the seat panel and retainer are configured to provide a different number of positions.

Additional features of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 6 is a sectional view taken along line 6—6 of FIG. 5, with the mount and crotch strap removed, showing that the retaining tabs and flexible fingers associated with each of the three pockets formed in the retainer have substantially the same configuration allowing the mount to be selectively received and retained in any one of the three pockets;

FIG. 7 is a sectional view similar to FIG. 6 showing the mount partially inserted into a middle pocket of the three pockets and showing the crotch strap extending from the mount through the associated slot formed in the retainer and through the associated slot formed in the bottom panel.

DETAILED DESCRIPTION OF THE DRAWINGS

Figure 1:
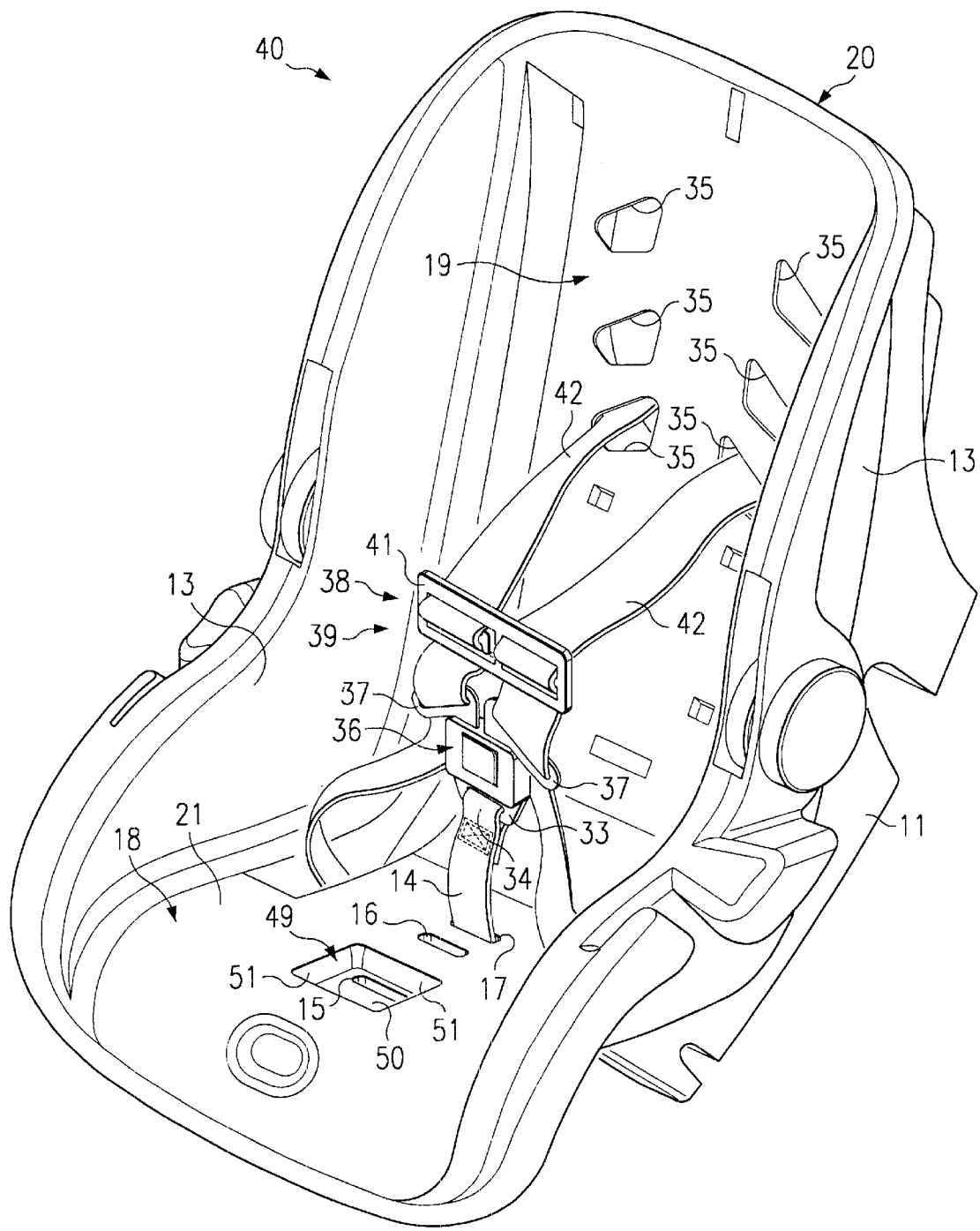
FIG. 1 is a perspective view of a juvenile seat assembly showing a seat harness extending between a back panel and a bottom panel of the juvenile seat assembly, the bottom panel including three laterally extending slots formed in a central region of the bottom panel, and the seat harness including a crotch strap extending upwardly from a rear slot of the three laterally extending slots.
Figure 2:
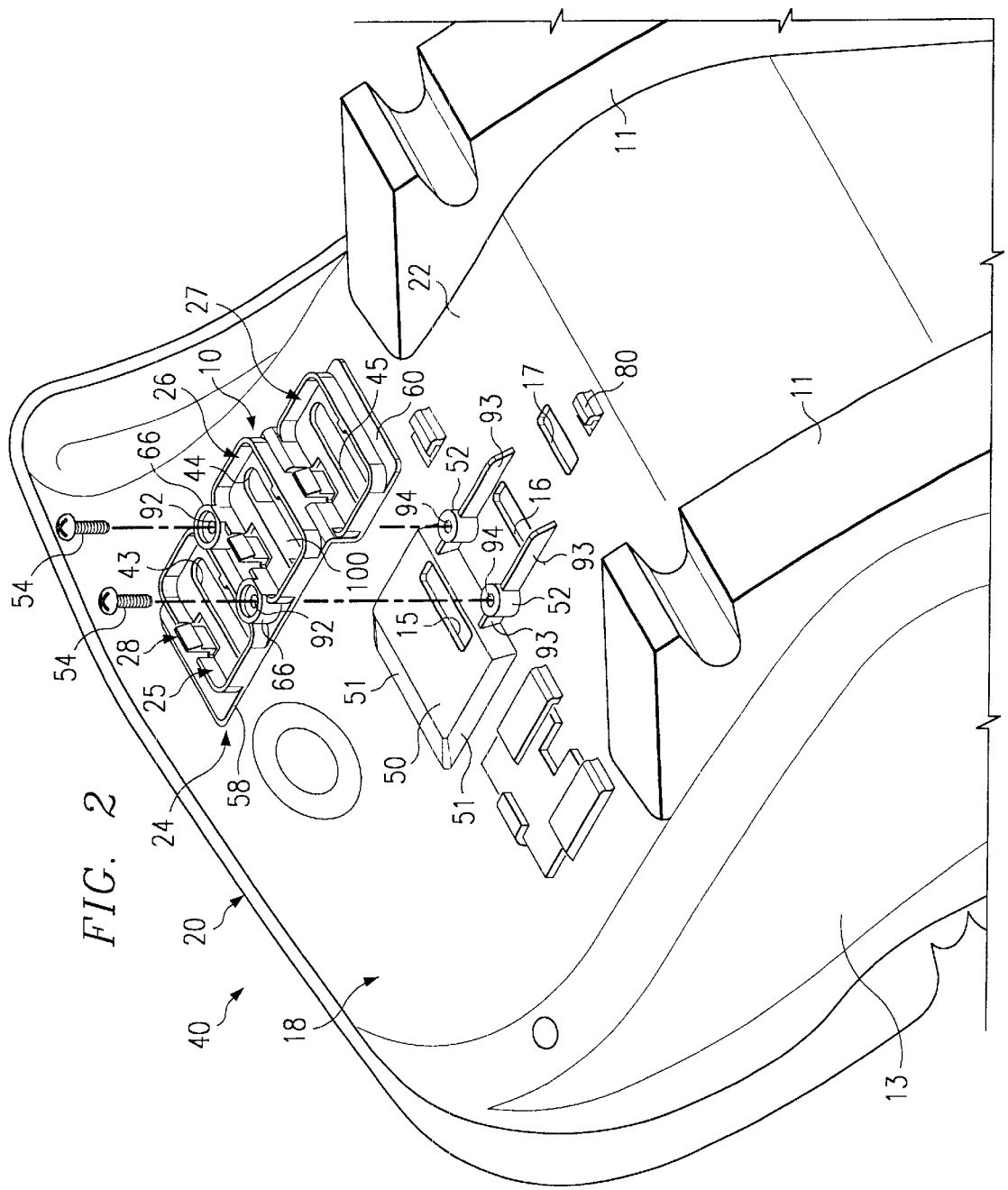
FIG. 2 is an exploded perspective view of the underside of the juvenile seat assembly of FIG. 1 showing a retainer arranged above an undersurface of the bottom panel and showing a pair of screws arranged for insertion through screw-receiving apertures formed in the retainer into threaded engagement with respective screw-receiving receptacles appended to the undersurface of the bottom panel.
Figure 3:
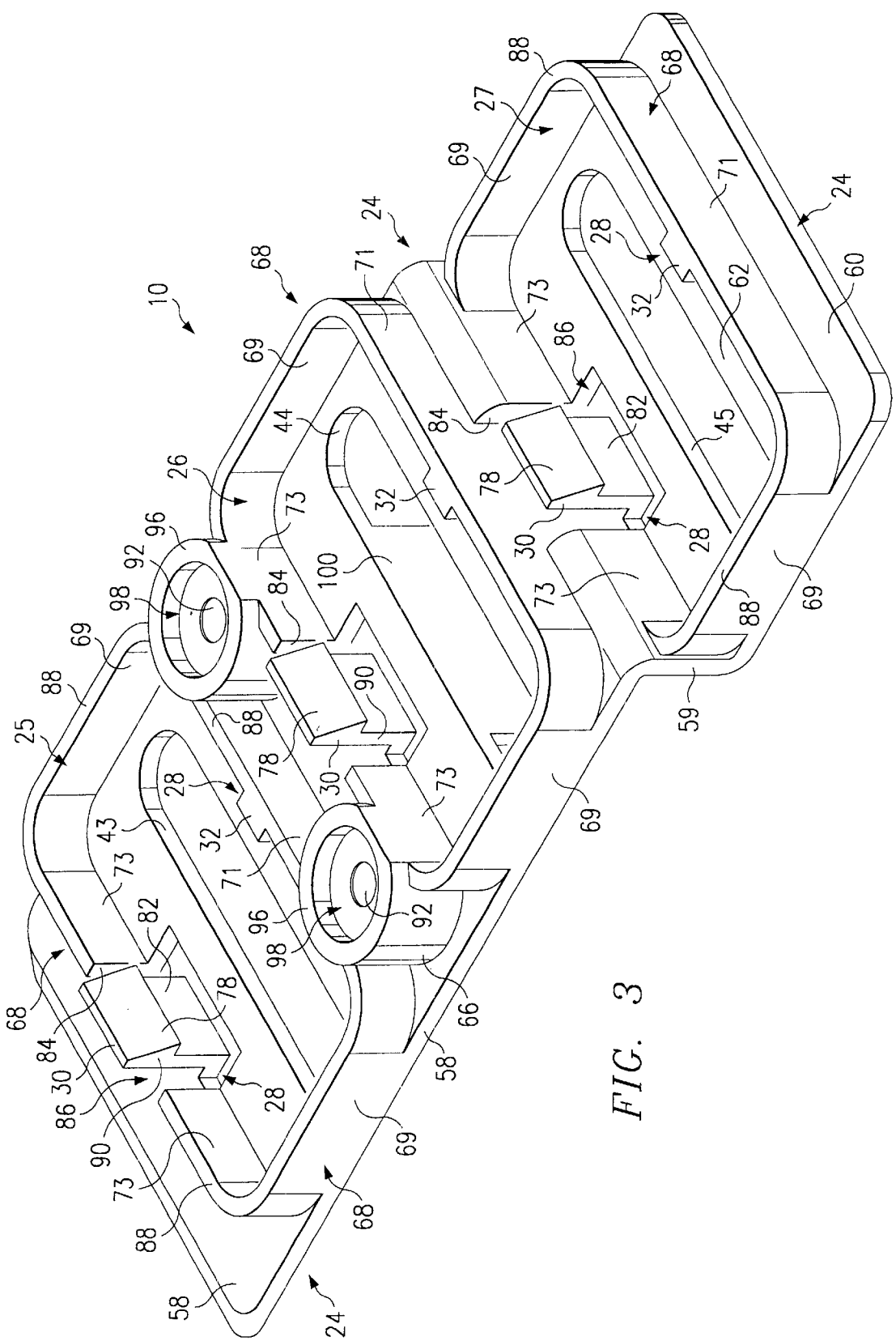
FIG. 3 is an enlarged perspective view of the retainer of FIG. 2 showing the retainer having a stepped base plate, the retainer being formed to include first and second pockets on a long portion of the stepped base plate, the retainer being formed to include a third pocket on a short portion of the stepped base plate, and the stepped base plate being formed to include three slots that are associated with respective pockets.
Figure 4:
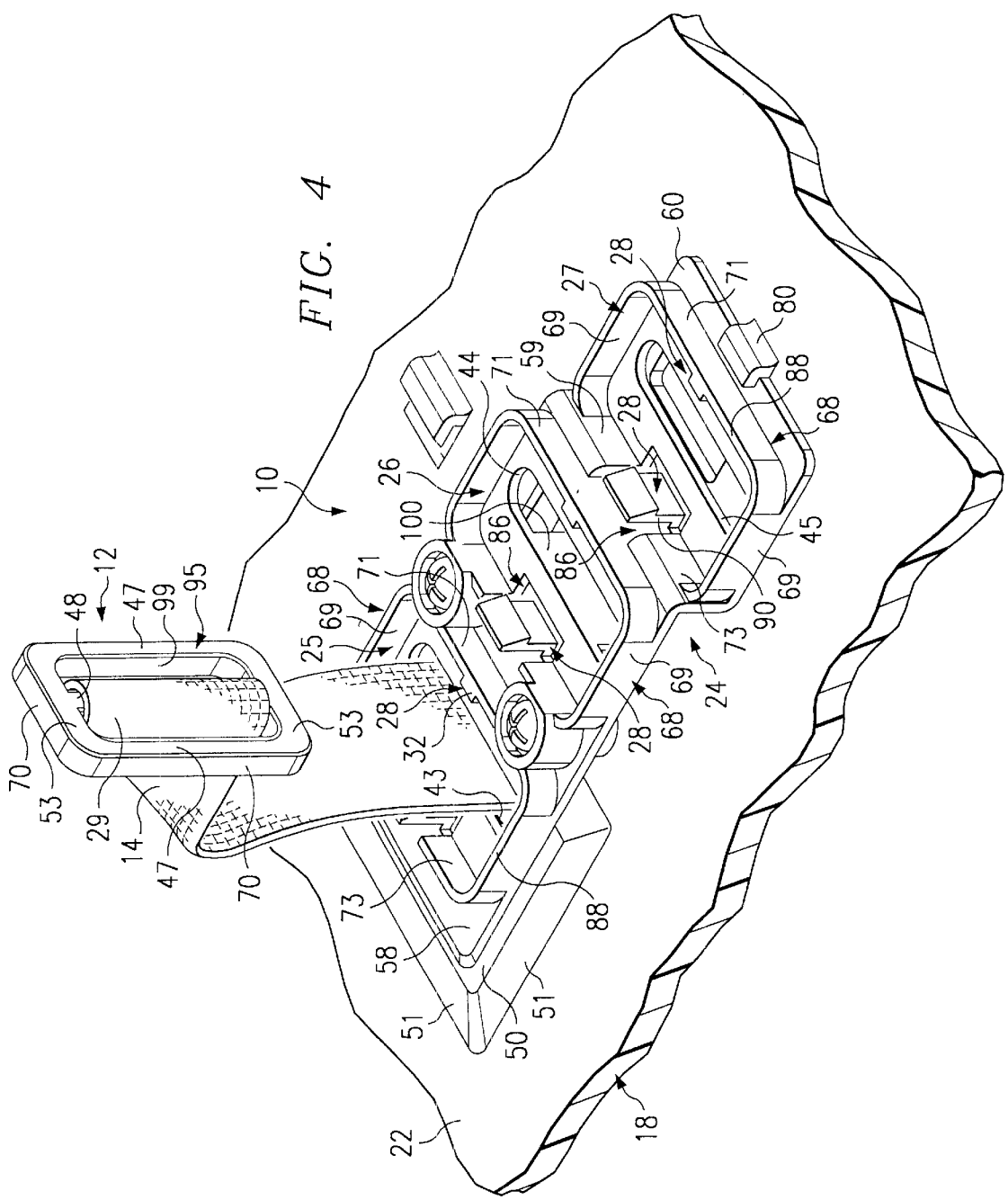
FIG. 4 is an enlarged perspective view of the underside of the juvenile seat assembly of FIG. 1 showing the crotch strap extending through one of the slots and through an associated one of the pockets formed in the retainer and showing a mount coupled to a looped end of the crotch strap.
Figure 5:
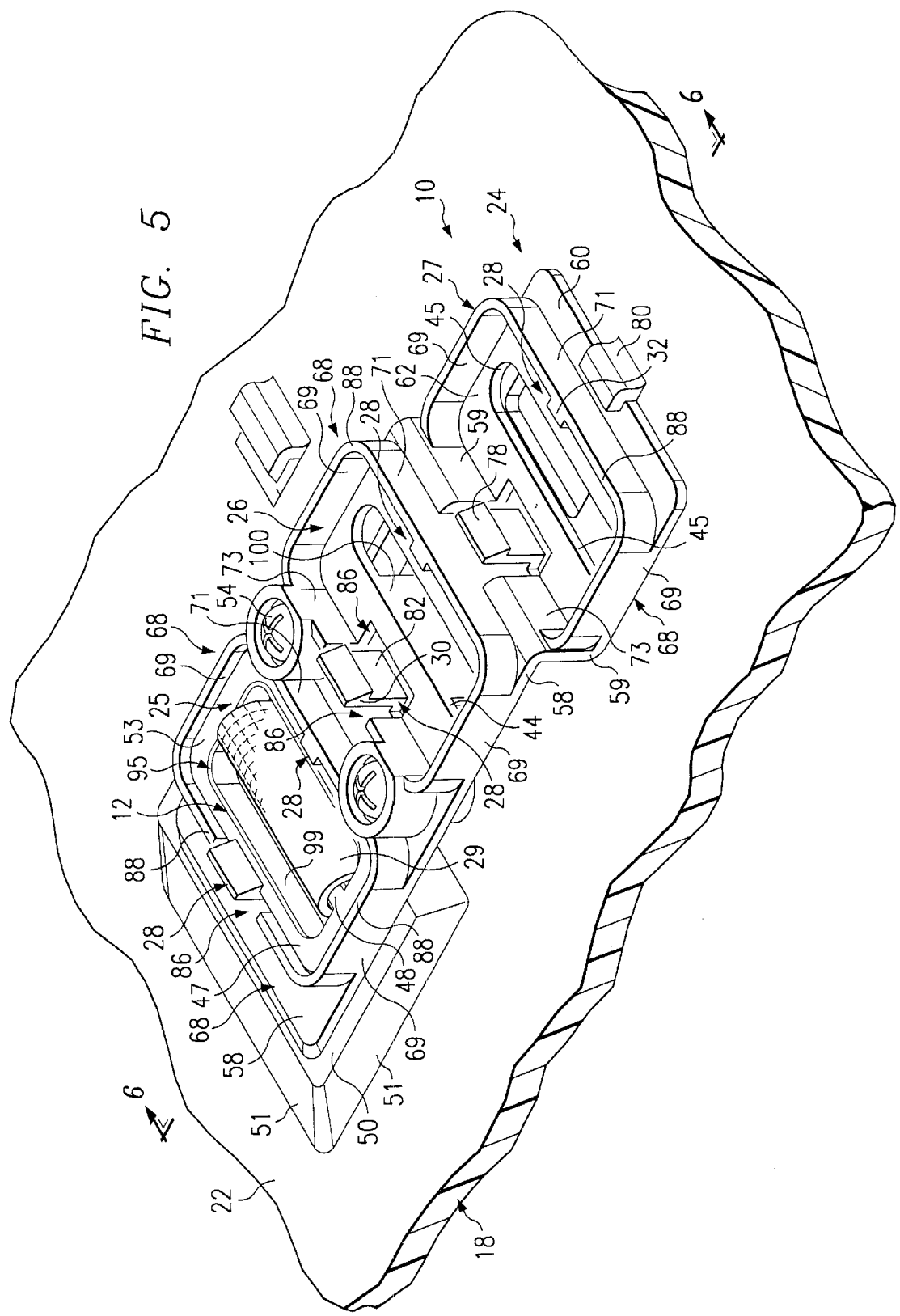
FIG. 5 is a perspective view similar to FIG. 4 showing the mount received in one of the pockets of the retainer such that pocket side walls of the retainer surround a majority of an outer periphery of the mount, the mount being retained in the pocket by a pair of retaining tabs, one of the retaining tabs being appended to a flexible finger that is situated in a space formed in one of the pocket side walls, and the other of the retaining tabs being appended to the pocket side wall opposite the flexible finger.
Figure 8:
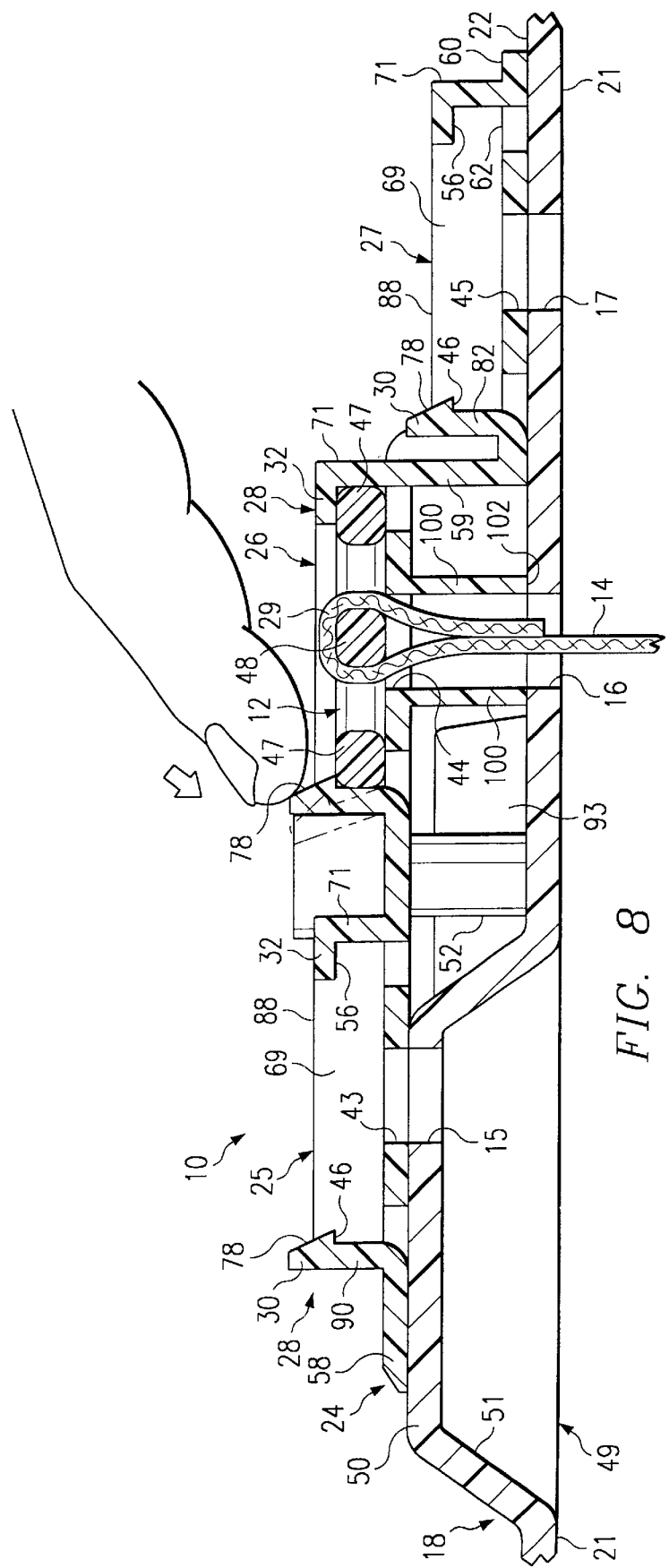
FIG. 8 is a sectional view similar to FIG. 7 showing the mount being retained in the middle pocket by the associated retaining tabs and showing the flexible finger adjacent the mount being moved into a release position (shown in phantom) such that the retaining tab appended to the flexible finger disengages from the mount allowing the mount to be removed from the middle pocket.

A juvenile seat assembly 40 having a bottom panel 18, a back panel 19, and a harness assembly 38 extending between back panel 19 and bottom panel 18 is shown in FIG. 1. Details of a retainer 10 that is mounted to an underside of bottom panel 18 are shown in FIGS. 2 and 3. A mount 12 that is coupled to a crotch strap 14 of harness assembly 38 is movable into a first pocket 25 of three pockets 25, 26, 27 formed in retainer 10 as shown in FIGS. 4 and 5. Retainer 10 is formed to include first, second, and third openings 43, 44, 45 that are aligned with respective openings 15, 16, 17 formed in bottom panel 18 as shown in FIG. 6. Mount 12 is selectively inserted into and retained in second pocket 26 of retainer 10 such that crotch strap 14 extends from mount 24 through opening 44 formed in retainer 24 and through opening 16 formed in bottom panel 18 as shown in FIGS. 7 and 8.

Seat assembly 40 includes a pair of side walls 13 that are appended to and extend vertically upwardly from bottom panel 18 and back panel 19 as shown in FIG. 1. Side walls 13 prevent a child seated in seat assembly 40 from moving laterally off of back panel 19 and bottom panel 18. Seat assembly 40 also includes a base coupling structure 11 appended to and extending away from an underside of bottom panel 18 and back panel 19. Base coupling structure 11 is configured to couple to a base (not shown) that is included in other juvenile equipment such as, for example, a car seat, a child swing, and a stroller. Thus, seat assembly 40 may be used in a variety of juvenile equipment having suitable base mechanisms that interface with base coupling structure 11 of seat assembly 40. One such suitable base mechanism is shown and described in U.S. patent application Ser. No. 09/614,078 which is titled CHILD VEHICLE SEAT WITH ADJUSTABLE AND REMOVABLE BASE and which is hereby incorporated herein by reference.

Bottom panel 18, back panel 19, side walls 13, and base coupling structure 11 of illustrative seat assembly 40 are formed integrally with one another and cooperate to provide a seat shell 20 of seat assembly 40. However, it will be appreciated that seat shell 20 could just as well be constructed from separate, pieces that couple together. In preferred embodiments, seat assembly 40 includes one or more cushions or padding layers (not shown) that cover bottom panel 18, back panel 19, and side walls 13 to enhance the comfort of the child seated in seat assembly 40.

Harness assembly 38 includes a crotch strap 14 that is positioned to lie between the legs of a child seated in seat assembly 40 and a shoulder harness 39 having a pair of shoulder straps 42 that extend over the shoulders of the child seated in seat assembly 40. Illustrative harness assembly 38 also includes a slider 41, a pair of shoulder harness tabs 37, and a buckle 36 as shown in FIG. 1. Slider 41 is movable along shoulder straps 42 between tabs 37 and back panel 19 to gather shoulder straps 42 toward one another to prevent shoulders straps 42 from moving laterally off of the shoulders of the child. Tabs 37 are configured for insertion into respective slots formed in buckle 36. Buckle 36 includes a locking mechanism (not shown) that engages tabs 37 when tabs 37 are inserted into buckle 36 to lock tabs 37 and buckle 36 together in a conventional manner.

Back panel 19 is formed to include a plurality of openings 35 that are arranged in laterally space-apart pairs. Each pair of openings 35 is formed in back panel 19 at a different elevation between the bottom end and top end of back panel 19 as shown in FIG. 1. Shoulder straps 42 are threaded from the back side of back panel 19 through a respective opening 35 of a selected pair of openings 35, through a respective slot formed in slider 41, through a respective slot formed in an associated shoulder harness tab 37, and through slots (not shown) formed in bottom panel 18. Of course, if seat assembly 40 includes any cushions or padding layers over back panel 19 and bottom panel 18, then shoulder straps 42 are threaded through slots formed in such cushions or padding layers at appropriate locations. Shoulder straps 42 are coupled to a shoulder strap adjustment mechanism (not shown) that is situated on the back side of seat assembly 40.

Bottom panel 18 includes a top surface 21, shown in FIG. 1, and an undersurface 22, shown in FIG. 2. Bottom panel 18 is formed to include first, second, and third openings 15, 16, 17 extending between top surface 21 and undersurface 22. Illustrative openings 15, 16, 17 are configured as laterally extending slots that are located at a central region of bottom panel 18 between side walls 13 and that are spaced apart longitudinally from one another between the front end and rear end of bottom panel 18. Bottom panel 18 is formed to include a recess 49 bounded by a bottom wall 50 and a set of side walls 51 that interconnect bottom wall 50 with the rest of bottom panel 18. Opening 15 is formed in bottom wall 50. Crotch strap 14 is threaded through a selective one of openings 15, 16, 17. An upper end of crotch strap 14 is formed as a loop 34 and buckle 36 includes a flange 33 having a slot that receives loop 34 as shown in FIG. 1.

Retainer 10 is coupled to undersurface 22 of bottom panel 18 as shown, for example, in FIGS. 2, 4, and 5. Harness assembly 38 includes a mount 12 coupled to the lower end of crotch strap 14. Mount 12 is selectively attachable to retainer 10 at any one of three positions corresponding to openings 15, 16, 17 and mount 12 is detachable from retainer 10. Retainer 10 is configured to retain mount 12 in place relative to bottom panel 18 as will be described in further detail below. Crotch strap 14 extends upwardly from mount 12 through whichever of openings 15, 16, 17 is positioned to lie above mount 12 when mount 12 is coupled to retainer 10. Thus, based upon the size of the child to be seated in seat assembly 40, a user will thread shoulder straps 42 through a selected pair of openings 35 and will attach mount 12 to retainer 10 having crotch strap threaded through a selected one of openings 15, 16, 17.

Retainer 10 includes a stepped base plate 24 having a flat long portion 58, a flat short portion 60 that is substantially parallel with long portion 58, and a connecting portion 59 extending between portions 58, 60 as shown best in FIG. 3. Portion 59 is substantially perpendicular to portions 58, 60. Portion 58 is formed to include first and second openings 43, 44 therethrough and portion 60 is formed to include a third opening 45 therethrough. Each of openings 43, 44, 45 is formed as a laterally extending elongated slot. Retainer 10 further includes three sets of pocket walls 68 configured to define first, second, and third pockets 25, 26, 27 of retainer 10. The two sets of pocket walls 68 associated with pockets 25, 26 are appended to portion 58 of base plate 24 and extend therefrom in perpendicular relation thereto. Likewise, the set of pocket walls 68 associated with pocket 27 are appended to portion 60 of base plate 24 and extend therefrom in perpendicular relation thereto.

Each set of pocket walls 68 includes a pair of end walls 69 extending parallel with the longitudinal dimension of base plate 24, a first side wall 71 extending laterally across base plate 24 between end walls 68, and a pair of side wall portions 73 extending laterally inwardly from respective end walls 68 toward one another in parallel relation with side wall 71. Thus, walls 68 are arranged in a rectangular configuration about each respective pocket 25, 26, 27. However, the corner regions of walls 68, that is, where end walls 69 join walls 71, 73, are curved so as to blend together along a radius.

In the illustrative embodiment, wall portions 73 associated with pocket 27 and connecting portion 59 of base plate 24 merge together and therefore, are essentially one and the same as shown best in FIG. 3. Side wall portions 73 each terminate at respective end edges 84 which confront one another. A finger-receiving space 86 is defined between each pair of end edges 84. Each of walls 69, 71, 73 extends downwardly away from base plate 24 by substantially the same amount such that lower edges 88 of respective walls 69, 71, 73 associated with pockets 25, 26 are substantially coplanar and edges 88 associated with pocket 27 lie in a plane that is offset from the plane defined by edges 88 associated with pockets 25, 26 due to the stepped configuration of base plate 24. In addition, each wall 69, 71, 73 has a substantially uniform thickness at all locations between lower edges 88 and base plate 24. Furthermore, illustrative base plate 24 has a thickness that is approximately the same as each of walls 69, 71, 73. Thus, each of the pockets 25, 26, 27 formed in retainer 10 has substantially the same size, that is, the volume of space associated with each pocket 25, 26, 27 is substantially the same.

Retainer 10 includes locking elements 28 that engage mount 12 to prevent mount 12 from falling downwardly out of the respective pocket 25, 26, 27 occupied by mount 12 when mount 12 is coupled to retainer 10. Locking elements 28 include fixed tabs 32, each of which are appended to a respective side wall 71 adjacent to the associated edge 88 and each of which extend from side wall 71 into a respective pocket 25, 26, 27 in spaced-apart relation with base plate 24. Locking elements 90 also include flexible fingers 90 and movable tabs 30 appended to flexible fingers 90.

Each flexible finger is L-shaped having a first portion appended to base plate 24 and a second portion extending from the first portion into the corresponding finger-receiving space 86 as shown best in FIG. 3. Movable tabs 30 project from respective fingers 90 into the associated pocket 25, 26, 27. In the illustrative embodiment, the second portions of flexible fingers 90 each include a planar face 82 that is parallel with wall portions 73 and that faces toward wall 71. Fingers 90 are configured so that each planar face 82 is inset by a slight amount into the respective pocket 25, 26, 27. Thus, the longitudinal distance between planar face 82 and wall 71 is slightly smaller than the longitudinal distance between each of wall portions 73 and the respective wall 71. In alternative embodiments, fingers 90 are configured so that planar faces 82 are substantially coplanar with the wall surfaces of respective wall portions 73.

Retainer 10 includes a pair of cylindrical bosses 66 extending away from base plate 22 as shown in FIGS. 2 and 3. Bosses 66 are positioned to lie between wall 71 associated with pocket 25 and walls 73 associated with pocket 26. Seat assembly 40 includes a pair of cylindrical receptacles 52 and a pair of ribs 93 appended to undersurface 23 of bottom panel 18 and extending downwardly therefrom as shown in FIG. 2. Ribs 93 each extend longitudinally in the fore-to-aft dimension of bottom panel 18. In addition, each rib 93 includes a first portion that extends between one of side walls 51 which defines recess 49 and a corresponding receptacle 52 and each rib 93 includes a second portion that extends rearwardly from a corresponding receptacle 52.

Each boss 66 is formed to include a fastener-receiving aperture 92 extending therethrough and each receptacle 52 is formed to include a threaded bore 94. Screws 54 extend through apertures 92 into threaded engagement with respective bores 94. Lower surfaces 96 of bosses 66 are each formed to include countersink recesses 98, shown in FIG. 3, that receive heads of screws 54. Bottom panel 18 is formed to include an L-shaped tab 80 that catches the rear end of portion 60 of base plate 24. Thus, screws 54 cooperate with tab 80 to couple retainer 10 to undersurface 23 of bottom panel 18. It will be appreciated that other types of fastening mechanisms, such as, for example, adhesives, snaps, hooks, movable latches, pins, rivets, and the like, may be used to couple retainer 10 to bottom panel 18 in lieu of screws 54. It will also be appreciated that retainer 10 may be formed integrally with bottom panel 18. In such an embodiment where retainer 10 is integral with bottom panel 18, walls 68 and locking elements 28 associated with pockets 25, 26, 27 are appended directly to undersurface 22 of bottom panel 18 and extend downwardly therefrom.

Illustrative retainer 10 is configured so that the front part of long portion 58 of base plate 24 associated with pocket 25 abuts the portion of undersurface 22 associated with bottom wall 50, so that the rear part of long portion 58 associated with pocket 26 overlies ribs 93 in spaced-apart relation with bottom panel 18, and so that short portion 60 of base plate 24 associated with pocket 27 abuts undersurface 22 of bottom panel 18 as shown in FIGS. 6–8. In addition, retainer 10 is configured so that openings 43, 44, 45 formed in base plate 24 are aligned with openings 15, 16, 17, respectively, formed in bottom panel 18.

Due to the stepped configuration of base plate 24 and due to the formation of recess 49 in bottom panel 18, the edge defining opening 44 is spaced apart vertically from the edge defining opening 16, whereas the edges defining openings 43, 45 are right next to the edges defining openings 15, 17 as shown in FIGS. 6–8. Retainer 10 is formed to include a pair of extension walls 100 that bridge the space between opening 44 formed in base plate 24 and opening 16 formed in bottom panel 18. Extension walls 100 are substantially parallel with connecting portion 59 of base plate 24 and are positioned to lie in the space between ribs 93. In addition, extension walls 100 terminate at end edges 102 that abut undersurface 22 of bottom panel 18 in the regions just fore and just aft of opening 16. Thus, opening 43 cooperates with opening 15 to provide a passage 15, 43 from the top side of seat panel 18 into pocket 25, opening 45 cooperates with opening 17 to provide a passage 17, 45 from the top side of seat panel 18 into pocket 27, and opening 44 along with extension walls 100 cooperate with opening 16 to provide a passage 16, 44, 100 from the top side of seat panel 18 into pocket 26. Furthermore, extension walls 100 prevent mount 12 from inadvertently moving into the space between long portion 60 of base plate 24 and bottom panel 18.

Mount 12 is selectively couplable to retainer 10 at three different positions as mentioned above. For example, mount 12 is couplable to retainer 12 at a first position in which mount 12 is received in pocket 25 as shown in FIG. 5. In addition, mount 12 is couplable to retainer 12 at a second position in which mount 12 is received in pocket 26 as shown in FIG. 8. Likewise, mount 12 is couplable to retainer 12 in a third position in which mount 12 is received in pocket 27. Crotch strap 14 extends from mount 12 through whichever of openings 15, 16, 17 and through whichever of openings 43, 44, 45 are associated with the selected pocket occupied by mount 12.

Mount 12 has a rectangular configuration and includes a pair of end bars 53, a pair of side bars 47 extending between end bars 53, and a middle bar 48 also extending between end bars 53 as shown in FIG. 4. Bars 53 are perpendicular to bars 47 and are parallel to one another. In addition, middle bar 48 is positioned to lie between bars 47 and is spaced substantially equidistantly from each of bars 47. Thus, a pair of strap-receiving slots 99 are defined between bars 53 and bars 48. A lower end of crotch strap 14 is formed as a loop 29. Middle bar 48 is received in loop 29 to couple mount 12 to crotch strap 14. Illustrative mount 12 is a substantially flat element having a planar lower face 95, a planar upper face 97, and a peripheral edge 70 extending between faces 95, 97. Thus, bars 47, 48, 53 have substantially the same thickness between faces 95, 97 of mount 12.

Each movable tab 30 of retainer 10 includes a retaining surface 46 that confronts an undersurface 62 of base plate 24 and each fixed tab 32 includes a retaining surface 56 that confronts undersurface 62 of base plate 24 as shown best in FIG. 6. The thickness of mount 12 between faces 95, 97 is substantially equivalent to the distance between retaining surfaces 46, 56 of respective tabs 30, 32 and undersurface 62 of base plate 24. In addition, the lateral dimension across pockets 25, 26, 27 between respective end walls 69 is substantially equivalent to the distance between the portions of peripheral edge 70 associated with end bars 53 of mount 12. Furthermore, the longitudinal distance across pockets 25, 26, 27 between respective side walls 71 and planar faces 82 of corresponding flexible fingers 90 is substantially equivalent to the distance between the portions of peripheral edge 70 associated with side bars 47 of mount 12. When mount 12 is received in a selected one of pockets 25, 26, 27, retaining surfaces 46, 56 of respective tabs 30, 32 hold mount 12 against undersurface 62 of base plate 24, respective end walls 69 prevent lateral or side-to-side movement of mount 12 relative to bottom panel 18, and respective walls 71 cooperate with associated planar faces 82 to prevent longitudinal or fore-to-aft movement of mount 12 relative to bottom panel 18. Thus, retainer 10 is configured to embrace mount 12 when mount 12 is received in each pocket 25, 26, 27 of retainer 10 to hold mount 12 in place relative to bottom panel 18 of seat assembly 40.

Openings 15, 16, 17 formed in bottom panel 18 and openings 43, 44, 45 formed in base plate 24 of retainer 10 are each formed as elongated slots as mentioned previously. Mount 12 must be oriented properly in order to be able to pass through openings 15, 16, 17, 43, 44, 45. Specifically, mount 12 is able to pass through openings 15, 16, 17, 43, 44, 45 when mount 12 is in a first orientation, shown in FIG. 4, having both end bars 53 aligned with the respective openings 15, 16, 17, 43, 44, 45 associated with a selected one of pockets 25, 26, 27 in which mount 12 is to be inserted. When mount 12 is in the first orientation, one end bar 53 overlies the other end bar 53 and bars 47, 48 are oriented in parallel relation with the direction of insertion of mount 12 through the respective openings 15, 16, 17, 43, 44, 45 associated with the selected pocket 25, 26, 27 in which mount 12 is to be inserted. Thus, in the first orientation, mount 12 is substantially perpendicular to top surface 21 and undersurface 22 of seat panel 18 and to portions 58, 60 of base plate 24.

In the illustrative embodiment, mount 12 passes through openings 15, 16, 17, 43, 44, 45 while in an end-to-end orientation relative to seat bottom 18 and relative to retainer 10. In alternative embodiments, each of openings 15, 16, 17, 43, 44, 45 are further elongated and mount 12 is able to pass through respective pairs of these openings in a side-to-side orientation, that is, having one side bar 47 overlying the other side bar 47 and having end bars 53 oriented parallel with the direction of insertion of mount 12 through the respective openings 15, 16, 17, 43, 44, 45 associated with the selected pocket 25, 26, 27 in which mount 12 is to be inserted.

After mount 12 is passed through a selected one of openings 15, 16, 17 formed in bottom panel 18 and through a corresponding one of openings 43, 44, 45 formed in retainer 10, mount 12 is then maneuvered into the associated pocket 25, 26, 27 to be retained by retainer 10 in a second orientation relative to bottom panel 18. When mount 12 is in the second orientation, mount 12 is substantially parallel with top surface 21 and undersurface 22 of bottom panel 18 and with portions 58, 60 of base plate 24. Thus, when mount 12 is in the second orientation, mount 12 is unable to pass through openings 15, 16, 17, 43, 44, 45 associated with the selected pocket 25, 26, 27 occupied by mount 12 because portions of bottom panel 18 and portions of base plate 24 of retainer 10 overlie portions of mount 12.

As mount 12 is maneuvered from the first orientation into a selected pocket 25, 26, 27 to be retained by retainer 10 in the second orientation, one of side bars 47 of mount 12 is inserted into the space defined between base plate 24 and the fixed tab 32 associated with the selected pocket 25, 26, 27 while the other of side bars 47 is located outside of the selected pocket 25, 26, 27 adjacent the corresponding movable tab 30 and then, mount 12 is pivoted in a direction indicated by arrow 76 as shown, for example, in FIG. 7 with regard to insertion of mount 12 into pocket 26. As mount 12 moves in direction 76, the side bar 47 situated outside the selected pocket 25, 26, 27 comes into contact with an inclined ramp surface 78 of movable tab 30. During further movement of mount 12 in direction 76, the bar 47 in contact with movable tab 30 wipes against ramp surface 78 thereby deflecting the corresponding flexible finger 90 from a locking position, shown in FIG. 7, to a releasing position, shown in FIG. 8 (in phantom). During insertion of mount 12 into the selected pocket 25, 26, 27, mount 12 moves in direction 76 until upper face 97 of mount 12 becomes flush with base plate 24 at which point mount 12 is clear of ramp surface 78 allowing flexible finger 90 to flex automatically back into the locking position to retain mount 12 in the selected pocket 25, 26, 27.

Although illustrative mount 12 and illustrative pockets 25, 26, 27 have complimentary rectangular configurations, it is within the scope of this disclosure for mount 12 and pockets 25, 26, 27 to have other complimentary configurations, such as, for example, square, round, and oval. Thus, the disclosure and claims of this application are not intended to be limited to mounts having only rectangular configurations or retainers having pockets with only rectangular configurations. In addition, although illustrative openings 15, 16, 17, 43, 44, 45 are formed as elongated slots and although illustrative mount 12 is a substantially flat element configured to pass through these openings, mounts and openings having other shapes or configurations are within the scope of this disclosure so long as the mount, of whatever shape, is able to pass through the corresponding, appropriately shaped openings.

Furthermore, although illustrative locking elements 28 of retainer 10 include fixed tabs 32 appended to walls 71, flexible fingers 90 appended to base plate 24, and movable tabs 30 appended to fingers 90, it is within the scope of this disclosure for other types of locking elements to be included in retainer 10. For example, alternative locking elements may include elements such as, for example, hooks, movable latches, ridges, ribs, detents, clips, straps, bands, and the like that are either formed integrally with the rest of the associated retainer or that are separate components that couple to the rest of the associated retainer. Thus, the term "locking element" as used in the claims is intended to cover all of the afore-mentioned elements and the equivalents thereof unless explicitly noted otherwise by the claim language of a particular claim.

While illustrative retainer 10 is coupled to bottom panel 18 of juvenile seat assembly 40 and while mount 12 is coupled to crotch strap 14 of harness assembly 38, it is within the scope of this disclosure for other types of retainers, identical or equivalent to retainer 10, to be used to couple other straps of a harness assembly, such as shoulder straps 42 of harness assembly 38, to other seat assembly portions, such as back panel 19. Thus, the term "seat panel" as used in the claims is intended to mean any portion of a seat shell of a juvenile seat assembly to which harness straps couple.

Although the invention has been described in detail with reference to certain preferred embodiments, variations and modifications exist within the scope and spirit of the invention as described and defined in the following claims.

I claim:

1. A juvenile seat assembly comprising
a seat having a seat panel formed to include an opening,
a harness including a strap and a mount coupled to the strap, the mount being movable relative to the seat between a first orientation in which the mount is able to pass through the opening and a second orientation in which the mount is unable to pass through the opening, and
a retainer coupled to the seat panel, the mount being couplable to the retainer to be held in the second orientation by the retainer, the strap extending from the mount through the opening when the mount is coupled to the retainer.

2. The juvenile seat assembly of claim 1, wherein the mount is a planar element that is substantially perpendicular to the seat panel when in the first orientation and that is substantially parallel with the seat panel when in the second orientation.

3. The juvenile seat assembly of claim 1, wherein the retainer is formed to include a pocket and the mount is received in the pocket when the mount is coupled to the retainer.

4. The juvenile seat assembly of claim 1, wherein the retainer includes a base plate, at least a portion of the base plate abuts the seat panel, and the base plate is formed to include an opening that is aligned with the opening formed in the seat panel.

5. The juvenile seat assembly of claim 4, wherein the mount abuts the base plate when the mount is coupled to the retainer.

6. The juvenile seat assembly of claim 4, wherein the retainer includes at least one locking element having a retaining surface and the mount includes a portion that is positioned to lie between the retaining surface and the base plate when the mount is coupled to the retainer.

7. The juvenile seat assembly of claim 4, wherein the retainer includes a plurality of walls appended to the base plate, the mount includes a peripheral edge, and the plurality of walls are arranged to surround at least a majority of the peripheral edge of the mount.

8. The juvenile seat assembly of claim 1, wherein the retainer includes at least one locking element having a retaining surface and the mount includes a portion that is positioned to lie between the retaining surface and the seat panel when the mount is coupled to the retainer.

9. The juvenile seat assembly of claim 8, wherein the at least one locking element includes a tab that is movable between a locking position having the retaining surface engaging the mount and a releasing position having the retaining surface disengaged from the mount.

10. The juvenile seat assembly of claim 8, wherein the at least one locking element includes a flexible finger that is movable between a locking position having the retaining surface engaging the mount and a releasing position having the retaining surface disengaged from the mount.

11. The juvenile seat assembly of claim 8, wherein the retainer includes a locking element that is movable between a locking position engaging the mount and a releasing position disengaged from the mount.

12. The juvenile seat assembly of claim 8, wherein the retainer includes a base plate and the locking element includes a flexible finger appended to the base plate.

13. The juvenile seat assembly of claim 8, wherein the retainer is positioned to lie beneath the seat and the mount is positioned to lie beneath the seat panel when the mount is coupled to the retainer.

14. The juvenile seat assembly of claim 1, wherein the retainer includes a plurality of walls, the mount includes a peripheral edge, and the plurality of walls are arranged to surround at least a majority of the peripheral edge of the mount.

15. The juvenile seat assembly of claim 1, wherein the mount is positioned to lie beneath the seat panel when the mount is coupled to the retainer.

16. A juvenile seat assembly comprising
a seat formed to include an opening,
a harness including a strap and a mount coupled to the strap, the strap extending from the mount through the opening, and
means for coupling the mount to the seat and for decoupling the mount from the seat.

17. The juvenile seat assembly of claim 16, wherein the means includes a retainer mounted to the seat, the retainer is formed to include a pocket, and the mount is received in the pocket.

18. The juvenile seat assembly of claim 16, wherein the means includes a base plate, at least a portion of the base plate abuts the seat, and the base plate is formed to include an opening that is aligned with the opening formed in the seat.

19. The juvenile seat assembly of claim 18, wherein the mount abuts the base plate when the mount is coupled to the means.

20. The juvenile seat assembly of claim 18, wherein the means includes at least one locking element having a retaining surface and the mount includes a portion that is positioned to lie between the retaining surface and the base plate when the mount is coupled to the means.

21. The juvenile seat assembly of claim 18, wherein the means includes a plurality of walls appended to the base plate, the mount includes a peripheral edge, and the plurality of walls are arranged to surround at least a majority of the peripheral edge of the mount.

22. The juvenile seat assembly of claim 16, wherein the means includes at least one locking element having a retaining surface and the mount includes a portion that is positioned to lie between the retaining surface and the seat when the mount is coupled to the means.

23. A juvenile seat assembly comprising
a seat having a seat panel formed to include an opening,
a harness including a strap and a mount coupled to the strap, the strap extending from the mount through the opening, and a retainer coupled to the seat panel, the mount being couplable to the retainer and decouplable from the retainer, the retainer including a pocket configured to receive the mount when the mount is coupled to the retainer, portions of the seat panel adjacent the opening overlying the pocket and overlying the mount when the mount is coupled to the retainer.

24. The juvenile seat assembly of claim 23, wherein the retainer includes a base plate, at least a portion of the base plate abuts the seat panel, and the base plate is formed to include an opening that is aligned with the opening formed in the seat panel.

25. The juvenile seat assembly of claim 24, wherein the mount abuts the base plate when the mount is coupled to the retainer.

26. The juvenile seat assembly of claim 24, wherein the retainer includes at least one locking element having a retaining surface and the mount includes a portion that is positioned to lie between the retaining surface and the base plate when the mount is coupled to the retainer.

27. The juvenile seat assembly of claim 24, wherein the retainer includes a plurality of walls appended to the base plate, the mount includes a peripheral edge, and the plurality of walls are arranged to surround at least a majority of the peripheral edge of the mount.

28. The juvenile seat assembly of claim 23, wherein the retainer includes at least one locking element having a retaining surface and the mount includes a portion that is positioned to lie between the retaining surface and the seat panel when the mount is coupled to the retainer.

29. The juvenile seat assembly of claim 28, wherein the at least one locking element includes a tab that is movable between a locking position having the retaining surface engaging the mount and a releasing position having the retaining surface disengaged from the mount.

30. The juvenile seat assembly of claim 28, wherein the at least one locking element includes a flexible finger that is movable between a locking position having the retaining surface engaging the mount and a releasing position having the retaining surface disengaged from the mount.

31. The juvenile seat assembly of claim 23, wherein the retainer includes a plurality of walls, the mount includes a peripheral edge, and the plurality of walls are arranged to surround at least a majority of the peripheral edge of the mount.

32. The juvenile seat assembly of claim 23, wherein the mount is positioned to lie beneath the seat panel when the mount is coupled to the retainer.

* * * * *